(12) United States Patent
Ruedin (10) Patent No.: US 7,961,906 B2
(45) Date of Patent: Jun. 14, 2011

(54) HUMAN DETECTION WITH IMAGING SENSORS

(75) Inventor: Joshua C. Ruedin, Austin, татTX (US)

(73) Assignee: Science Applications International Corporation, San Diego, CA (US)

( * ) Notice: Subject to any disclaimer, the term of this patent is extended or adjusted under 35 U.S.C. 154(b) by 1168 days.

(21) Appl. No.: 11/619,434

(22) Filed: Jan. 3, 2007

(65) Prior Publication Data

US 2008/0159591 A1    Jul. 3, 2008

(51) Int. Cl.
G06K 9/00    (2006.01)
G06K 9/48    (2006.01)

(52) U.S. Cl. .................. 382/103; 382/154; 382/199

(58) Field of Classification Search ............ 382/103, 382/154, 199
See application file for complete search history.

(56) References Cited

U.S. PATENT DOCUMENTS

| | | | | |
|---|---|---|---|---|
| 4,364,030 A * | 12/1982 | Rossin | | 340/567 |
| 7,088,243 B2 * | 8/2006 | Jin et al. | | 340/541 |
| 7,366,325 B2 * | 4/2008 | Fujimura et al. | | 382/104 |
| 2008/0036576 A1 * | 2/2008 | Stein et al. | | 340/425.5 |
| 2008/0292192 A1 * | 11/2008 | Seki | | 382/199 |
| 2010/0013615 A1 * | 1/2010 | Hebert et al. | | 340/425.5 |

\* cited by examiner

*Primary Examiner* — Bhavesh M Mehta
*Assistant Examiner* — Stephen R Koziol
(74) *Attorney, Agent, or Firm* — Banner & Witcoff, Ltd.

(57) ABSTRACT

A method and apparatus for determining human beings from terrain or man-made obstacles is provided. A long-wave infrared camera along with additional devices such as a color camera, two cameras in stereo configuration, and/or a LADAR scanner are used such that the physical scene captured in one image is the same from all of the devices. The images may be processed such that areas of interest representing characteristics of human beings are labeled likely human. The processing may include determining the physical size, range, and relative locations of the objects found in the images. The system, method and apparatus may be used in unmanned vehicles or autonomous machines, as a driving aid to a manned vehicle or system, or as part of a security system.

17 Claims, 11 Drawing Sheets

HUMAN DETECTION WITH IMAGING SENSORS

FIELD OF THE INVENTION

The invention relates generally to processing of images. More particularly, the invention provides a method and system for detecting people in a field of view.

BACKGROUND

Detection of human beings in a field of view of a camera is used in various systems such as security, combat, and commercial systems. In security systems, the detection of unauthorized persons in areas for which they do not have access permission may be crucial to protect people and property. In combat systems, human detection may be crucial for targeting purposes in order to prevent injury to troops or civilians. In commercial systems, detection of human beings may be used to assist drivers of automobiles in avoiding accidents with pedestrians. In addition, the detection of human beings may be used as inputs to a microprocessor or controller controlling unmanned aircraft or vehicles.

For example, unmanned vehicles may be used to provide surveillance in dangerous areas or situations where threats of bodily harm exist. These unmanned machines may be able to provide feedback in the form of video or audio playback. For example, unmanned machines may be used to assist in crowd control situations. These unmanned machines must be able to distinguish human beings from terrain or other objects so as not to harm these human beings while performing various tasks such as driving.

Various technologies such as LADAR (laser radar), LWIR (long-wave infrared), motions systems, and face recognition software may be used to detect humans. However, each of these various technologies has problems in discriminating human beings from terrain or man-made obstacles. For instance, problems exist using LADAR systems in accurately recognizing a human being in a crouched position from a shrub of similar proportions. Problems also exist in detection of a human being using LWIR when the image contains numerous warm objects as different objects may have similar thermal emission characteristics to that of a human being. Further problems exist in detection of human beings in images due to large variations in location lighting, size, range, and body dimensions of different people. Detection of human beings is even more difficult and unreliable if the sensing device is mounted on a moving platform such as on an automobile or unmanned vehicle.

Thus, it would be advancement in the art to provide a method and apparatus which accurately detects both stationary and moving personnel in a field of view.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In an aspect of the invention, a method and apparatus are provided for combining long-wave infrared (LWIR) images from an infrared sensitive camera with corresponding images from other devices. The other devices may include devices such as two cameras in a stereo configuration, a color camera, and/or a LADAR scanner. The various cameras may be boresighted such that the physical scene captured in one image is the same as in the other images.

In an aspect of the invention, a LWIR image may be processed in a computer to identify areas of the image that correspond to thermal emission characteristics of a human being. In an embodiment, the physical size and range of this area of interest may be calculated from the disparity between two images from stereo cameras. Areas of interest with sizes appropriate for humans may be labeled as "likely humans", and their relative location marked as areas for the unmanned or manned system to avoid.

In another aspect of the invention, areas of interest identified in the LWIR image, may be identified in the scan from a LADAR sensor. Areas of interest with sizes appropriate for humans may be labeled as "likely humans" and their relative location marked as areas for the manned or unmanned system to avoid.

In a further aspect of the invention, areas of interest identified in the LWIR image, may be identified in a color image. These images may then be used in a pattern detection algorithm to find human shapes (e.g. faces).

In an additional aspect of the invention, areas of interest identified in the LWIR image, may be identified in a color image. These images may then be used in a pattern detection algorithm to find textures learned to match a specific human (e.g. camouflage clothing pattern). In another embodiment, the images may be used as training images to train a learning-based human detection algorithm or image classifier.

In yet another aspect of the invention, two LWIR sensors in a stereo configuration may be used. An area of interest corresponding to the thermal emission characteristic of a human being may be identified, and the range and size of the area of interest determined by stereo disparity calculation. Areas of interest with sizes appropriate for humans may be labeled as "likely humans" and their relative location noted for the manned/unmanned security system.

DESCRIPTION

Figure 1:
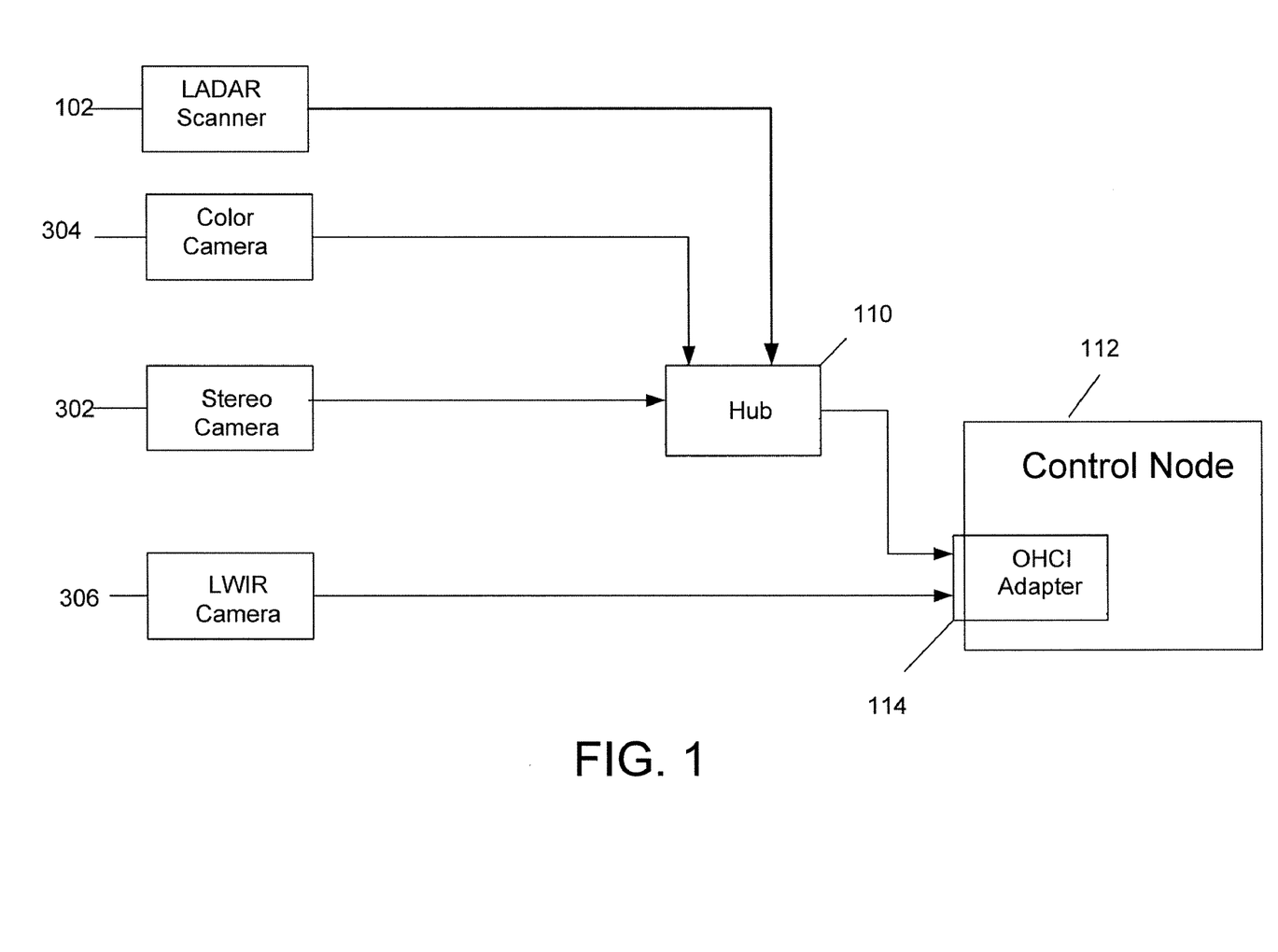
FIG. 1 illustrates a block diagram of various elements of a human being detection apparatus in accordance with an aspect of the invention.

FIG. 1 illustrates a block diagram of various elements of a human being detection apparatus in accordance with an aspect of the invention. As shown in FIG. 1 various input devices such as a LADAR scanner 102, a color camera 304, a stereo camera 302, and a LWIR camera 306 may be utilized to detect human beings. The LADAR scanner 102, color camera 304, and stereo camera 302 may send output directly to hub 110 using a standard such as IEEE 1394. IEEE 1394 allows for high levels of video data transfer rates in real-time. Hub 110 and LWIR camera 306 may forward output to a control node 112 via an OHCI compliant adapter 114 also using IEEE 1394. Control node 112 may be a personal computer or other computing device. For example, control node 112 may include a desktop, a laptop, a server, a router, a network PC, a peer device or other common network node.

Figure 2:
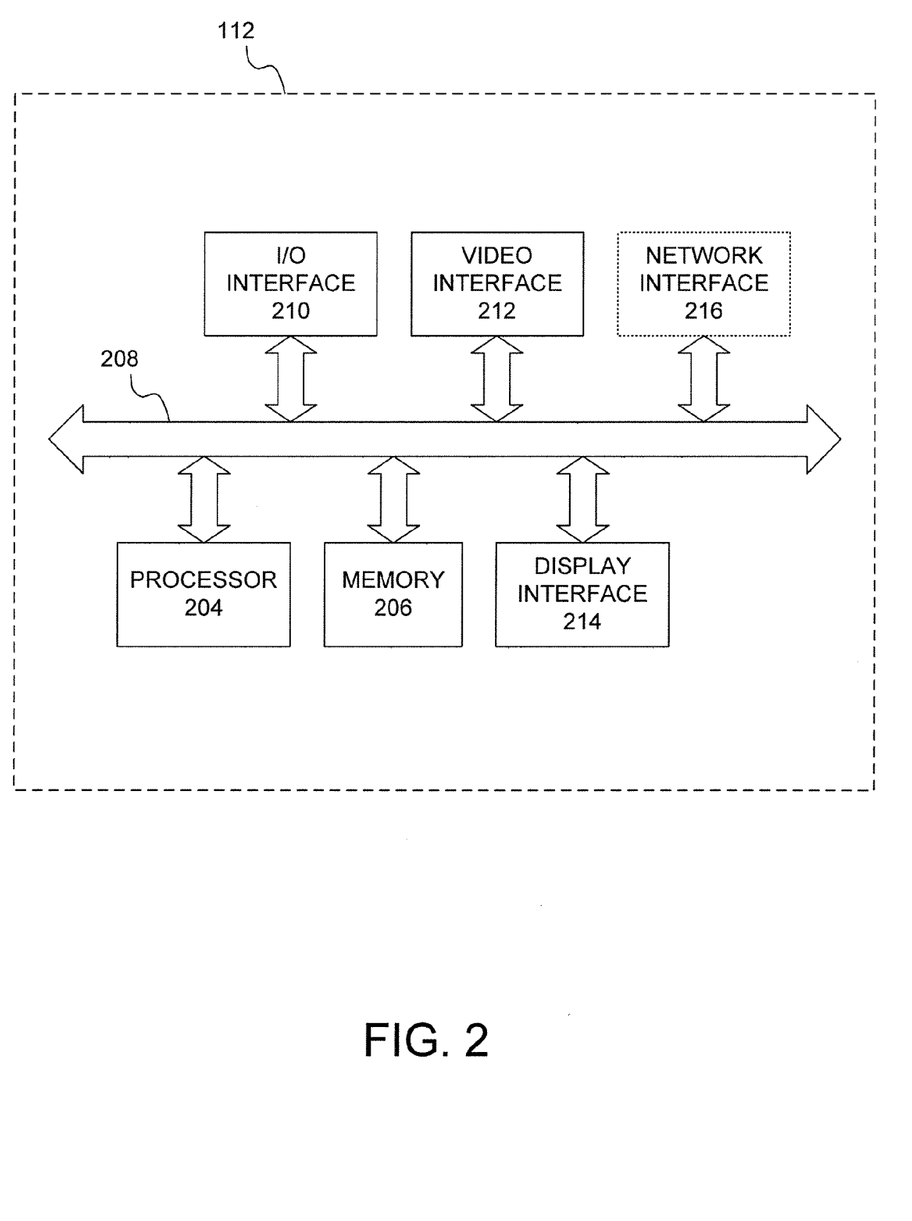
FIG. 2 represents a block diagram depicting components of control node or computer used in accordance with an aspect of the invention.

FIG. 2 represents a block diagram depicting components of control node or computer 112 used in accordance with an aspect of the invention. In FIG. 2, a processor 204 may be connected to memory 206 via bus 208. Memory 206 may include volatile memory, such as random access memory (RAM), or non-volatile memory, such as flash memory or a hard disk drive. Also connected to processor 204 may be an Input/Output Interface 210, which may communicate with and pass data from connected peripherals, including numerous cameras or sensors, perhaps using USB or a wireless standard, such as Bluetooth. Computer 112 may include a video interface 212 for receiving and transmitting video signals for storage in memory 206 or processing in processor 204. A display interface 214 may also be utilized to relay video signals to an external display. An optional network interface 216 may be used to communicate with an external computer, possibly to transmit and receive human being position and situational data (to other team members, or via satellite back to headquarters). Bus 208 may be comprised of a single or multiple signal buses for communicating between components.

Figure 3:
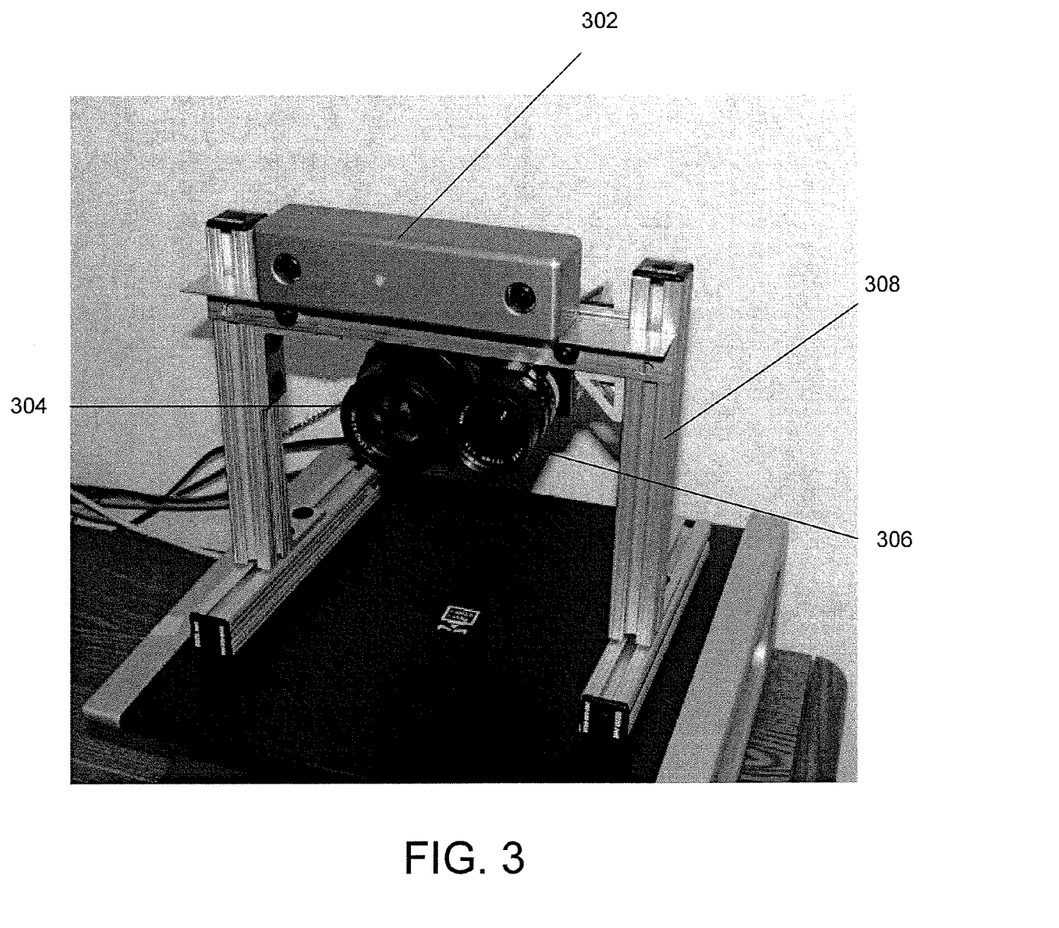
FIG. 3 illustrates a view of a human being detection apparatus in accordance with an aspect of the invention.

FIG. 3 illustrates an apparatus for use in human being detection that may be used in various aspects of the invention. In FIG. 3, a stereo camera 302, a color camera 304, and a LWIR camera 306 may be mounted on support structure 308. Support structure 308 may allow various cameras (302-306) to be moved in either the vertical or horizontal directions when mounted. Support structure 308 may also provide additional space for mounting a LADAR scanner (not shown). In one aspect of the invention, the stereo camera 302 may be a two lens stereo vision camera that allows inter-camera synchronization. In another aspect of the invention, the LWIR camera 306 may be a long-wave handheld thermal focal plane array camera capable of temperature measurement.

In one aspect of the invention, the LWIR camera may be a FLIR A20 thermal infrared camera and the stereo camera may be a Grey Research Bumblebee two lens stereo vision camera.

Figure 4:
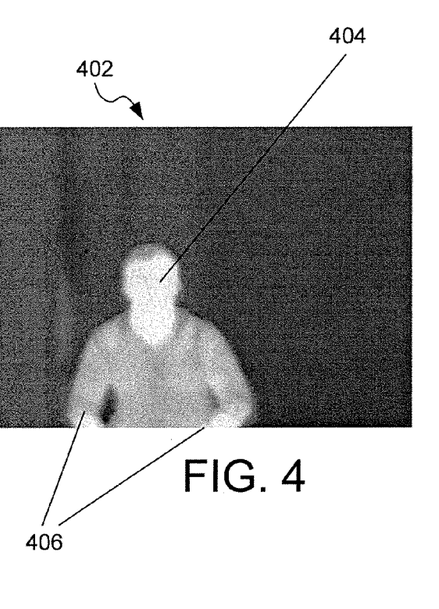
FIG. 4 illustrates exemplary output from a LWIR camera in accordance with an aspect of the invention.

FIG. 4 illustrates exemplary output 402 from a LWIR camera 306 in accordance with an aspect of the invention. As shown in FIG. 4, the thermal characteristics of a human being may be distinguished from in animate objects. In addition, thermal characteristics of different areas of a person's body are illustrated. For example, the uncovered face 404 of the person shown in FIG. 4 has a warmer heat signature than the covered arms 406 of the person.

Figure 5:
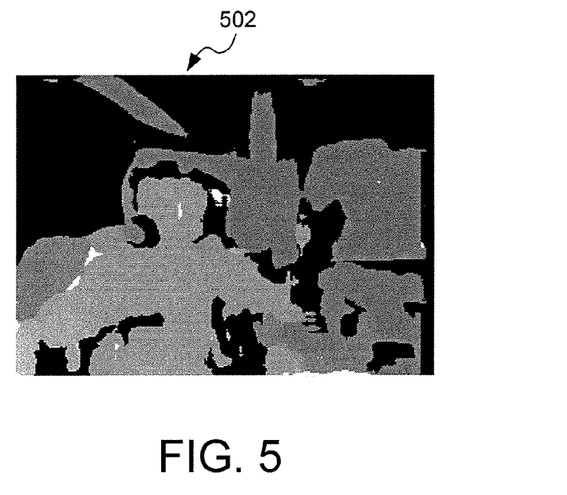
FIG. 5 illustrates exemplary output from a stereo camera in the form of a disparity map in accordance with an aspect of the invention.

FIG. 5 illustrates exemplary output 502 from a stereo camera 302 in accordance with an aspect of the invention. The stereo camera may be used to determine disparity information for calculating a centroid of an object and range to that object. In an aspect of the invention, a stereo camera may produce two images and a software library running on a processor may calculate the disparity. In another embodiment, a disparity image may be produced with a stereo camera's on-board electronics. A disparity map as shown in FIG. 5 may be created from the disparity information.

Figure 6:
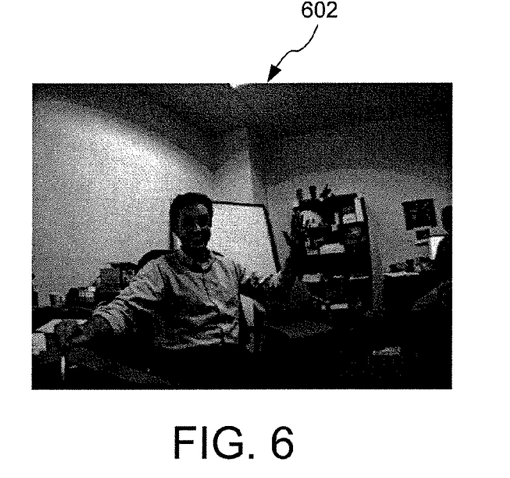
FIG. 6 illustrates exemplary output from a color camera in accordance with an aspect of the invention.

FIG. 6 illustrates exemplary output 602 from a color camera 304 in accordance with an aspect of the invention. The color camera output or image may be useful as a 2-D backdrop for overlaying the results of other devices onto the image so that an overall display may be construed.

Figure 7:
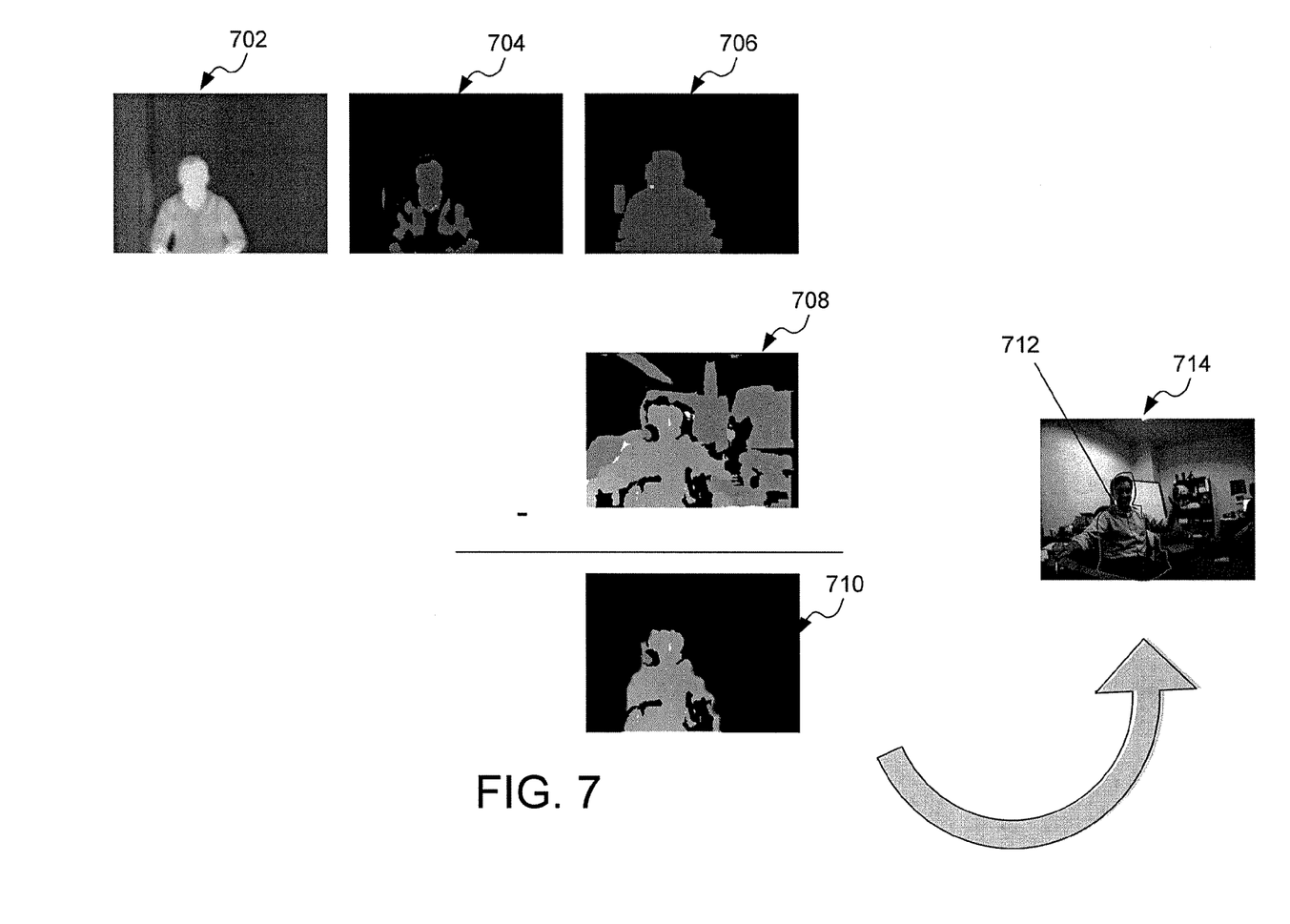
FIG. 7 illustrates a method of detecting a human being using a LWIR camera and a stereo camera in accordance with an aspect of the invention.

FIG. 7 illustrates a method of detecting a human being using a LWIR camera and a stereo camera in accordance with an aspect of the invention. In FIG. 7, a LWIR camera 306 may be used to identify areas of interest of image 702. In image 704, a windowing operation may be used to remove data that is not of interest. For instance, areas of image 702 that may be to cold to represent a possible human being may be removed from further processing as this improves run time. As those skilled in the art will realize, the LWIR camera may measure infrared radiation emitted from the scene in the 8-14 um wavelengths. In an aspect of the invention, an assumption may be made that everything in the scene has the same emissivity and so the energy emitted may be proportional to the temperature of what is being viewed. In an aspect of the invention, objects with temperatures colder than 70 degrees Fahrenheit and warmer than 100 degrees Fahrenheit are excluded as they are unlikely to be humans. As those skilled in the art will realize, the temperate range of 70-100 degrees Fahrenheit may be adjusted based on a number of factors such as ambient conditions of the scene being captured. For example, an exemplary temperature range for detection of humans may be 95-100 degrees Fahrenheit indoors and 70-100 degrees Fahrenheit outdoors.

In image 706, standard image processing filtering type techniques may be used such as erode and dilate. Erode may shrink the boundaries of the image and remove outliners in the image; whereas, dilate may enlarge or grow the image to fill gaps.

Image 708 may represent a disparity map produced from the output of the stereo camera. The disparity map may be used to calculate the centroid and the range to the displayed objects.

Image 710 illustrates a masked disparity map which may be the result of using image 706 as a template to cutout the portion of image 708 that may represent a human being. In order words, image 710 is the result of image 708 subtracted from image 706. As the disparity map contains range information, the surface area of the LWIR masked areas may be calculated in image 710. If the surface area is consistent with that of a human being then an outline 712 indicating that the object is a likely a human being may be drawn around the object in image 714. In an aspect of the invention, the surface area of a human being may be based on Leonardo's Vitruvian man, in which the maximum width of the shoulders of a person is about ¼ the height, and the maximum depth of the body is about ⅙ the height. For example, for a 2 m tall person, the frontal surface area may be $2*(2*¼)=1.0$ m$^2$ of frontal area. If the person is standing sideways, then the surface area in view may be $2*(2*⅙)=0.66$ m$^2$. In an aspect of the invention, the window used may range from about 0.5 m$^2$ to 1.0 m$^2$ which may be slightly smaller then the frontal surface area as there might be some occlusion of the person.

Figure 8:
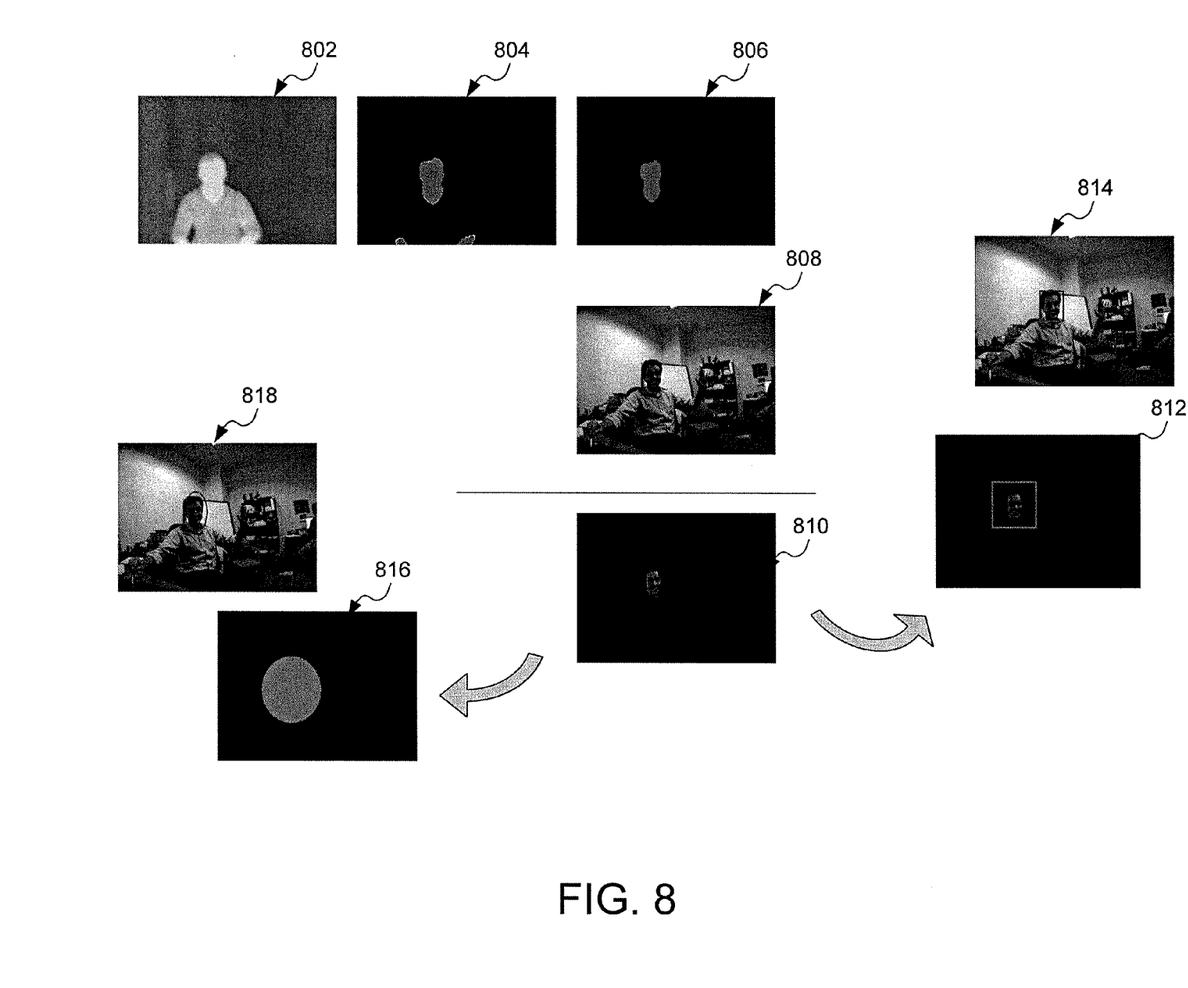
FIG. 8 illustrates a method of detecting a human being using a LWIR camera and a color camera in accordance with an aspect of the invention.

FIG. 8 illustrates a method of detecting a human being using a LWIR camera and a color camera in accordance with an aspect of the invention. In FIG. 8, a LWIR camera 306 may be used to identify body temperature areas of image 802. In image 804, a windowing operation may be used to remove data that is not of interest. For instance, areas of image 802 that may not represent a face of a human being may be removed from further processing as this improves run time. In an aspect of the invention, the LWIR camera may measure infrared radiation. An assumption may be made about the emissivity of the scene wherein a default emissivity may be equal to 0.97. This may allow a correlation of the image brightness/color to temperature.

In an aspect of the invention, objects with temperatures colder than 79 degrees Fahrenheit and warmer than 100 degrees Fahrenheit are excluded as they are unlikely humans. As those skilled in the art will realize, the temperate range of 70-100 degrees Fahrenheit may be adjusted based on a number of factors such as the ambient conditions of the scene being captured. For example, an exemplary temperature may be 95-100 degrees Fahrenheit indoors and 70-100 degrees Fahrenheit outdoors. In another embodiment, the temperature range may be fine tuned based on operating parameters such as ambient temperature.

In image 806, standard image processing filtering techniques may be used such as erode. Erode may shrink the boundaries of the image and remove outliners in the image.

Image 808 may represent a color image of the object of interest. Image 810 illustrates a masked color map which may be the result of using image 806 as a template to cut out the portion of image 808 that may represent a face of a human being. In other words, image 810 may be the result of image 808 subtracted from image 806.

In an aspect of the invention, two types of identification algorithms may be enhanced by masking with a dynamic template based on the LWIR image. Areas not of interest may be automatically excluded from the image searches allowing more sensitive detectors with fewer false positives.

In an aspect of the invention, image 812 illustrates a potential human face 813. The masked color map shown in image 810 may be inputted to a face recognition algorithm to determine if the object identified is a human face. The utilized face recognition software may be able to identify the person in image 814 if a match of the person's face is located in the database.

In another aspect of the invention, a masked color map image 816 may be used by a skin matching algorithm to examine the color of the potential face shown in image 810 to determine if the color of the potential human face matches a known human skin color such as that shown in image 816.

Figure 9:
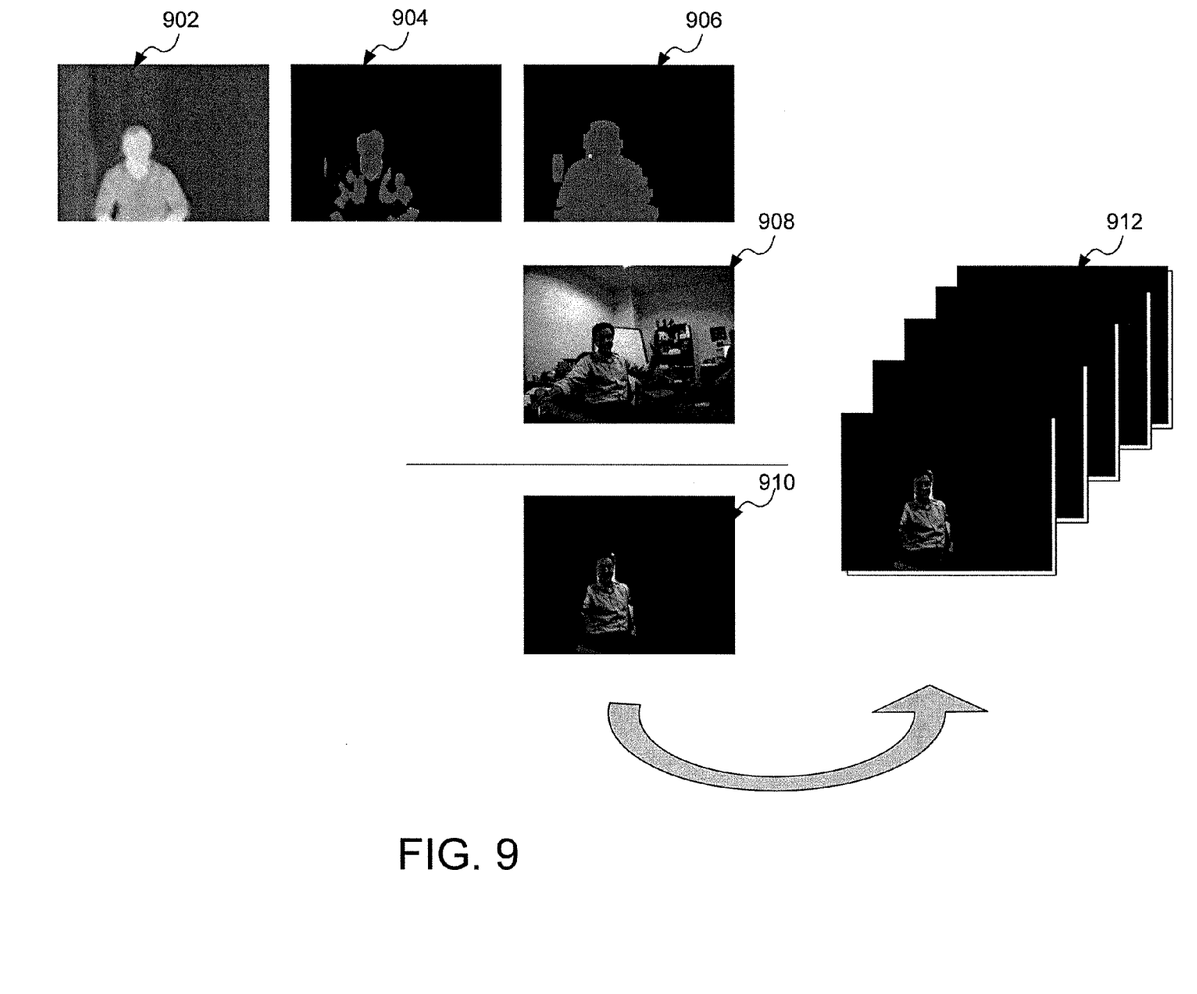
FIG. 9 illustrates a method of storing data concerning human characteristics for use in a database using a LWIR camera and a color camera in accordance with an aspect of the invention.

FIG. 9 illustrates a method of storing data about human characteristics for use in a database using a LWIR camera and a color camera in accordance with an aspect of the invention. In FIG. 9, a LWIR camera 306 may be used to identify body temperature areas of image 902. In image 904, a windowing operation may be used to remove data that is not of interest. For instance, areas of image 902 that may be to cold too represent a possible human being may be removed from further processing as this improves run time. For instance, temperatures that are below 70 degrees Fahrenheit may be removed. Those skilled in the art will realize that temperatures above 100 degrees Fahrenheit may also be removed. In another aspect of the invention, temperature ranges may be tunable and may be functions of environmental conditions such as ambient temperature and humidity. In image 906, standard image processing filtering techniques may be used such as erode and dilate. Erode may shrink the boundaries of the image and remove outliners in the image; whereas dilate may enlarge or grow the image to fill gaps.

Image 908 may represent a color image of the object of interest. Image 910 illustrates a masked color map which may be the result of using image 906 as a template to cut out the portion of image 908 that may represent a figure of a human being. In other words, image 910 is the result of image 908 subtracted from image 906.

The masked color map of image 910 may be stored as part of a data set 912 for use in training various classifiers. For instance, the database may be used with various new algorithms to assist in the detection of human beings. The data set 912 may include a set of frames each containing an image of a person with the background removed. During operation, a deck of images saved for offline processing may be collected that are known to contain a person in different poses that distinctly identify the person. The set of images may be later used as a training set for other methods of human detection such as pattern recognition, neural net, and image classification.

Figure 10:
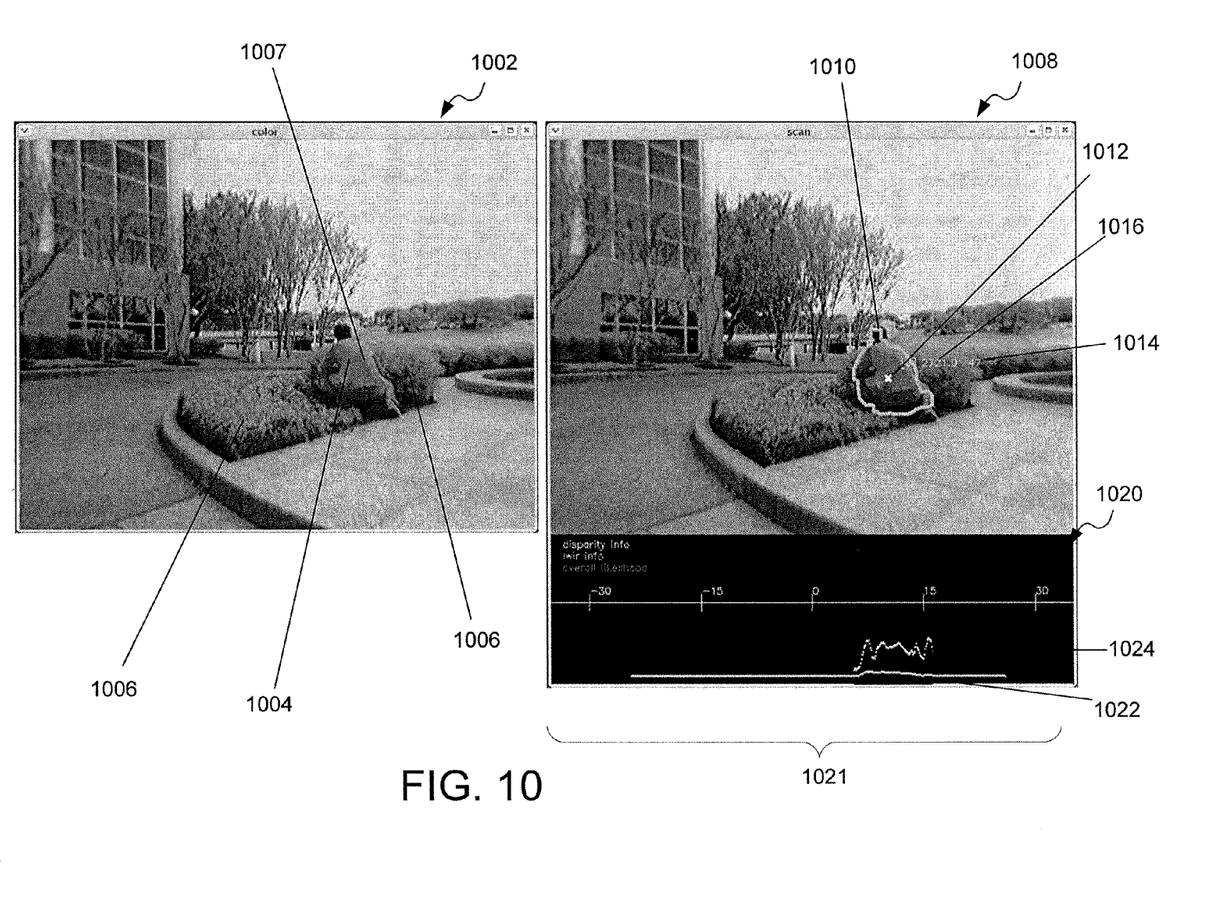
FIG. 10 illustrates exemplary output shown on a display using various cameras to detect human beings in accordance with an aspect of the invention.

FIG. 10 illustrates exemplary output on a display using various cameras to detect human beings in accordance with an aspect of the invention. In FIG. 10, an image 1002 from a color camera is illustrated in which a person 1004 is shown crouched next to bushes 1006. The person 1004 may be wearing a green shirt 1007 which may blend with the surrounding landscape including bushes 1006. In FIG. 10, a second image 1008 is illustrated in which output from a long-wave infrared camera may be overlaid on color image 1002. An outline 1010 may be overlaid onto image 1002 representing the portion of the image from the long-wave infrared camera which may represent a possible human being based on measured thermal characteristics. The outline 1010 in image 1008 may represent the thermal characteristics of person 1004. For instance, an object having a temperature ranging between 95 and 100 degrees Fahrenheit indoors, and 70-100 Fahrenheit outdoors may represent a potential human being. This range may be adjusted as a function of ambient conditions.

In addition, image 1008 may also include output from a stereo camera to be used to assist in determining whether objects in the image are human beings. For example, a stereo camera 302 may display disparity information for determining a centroid of an object and range to that object. For instance, the centroid of person 1004 may be displayed using an "x" 1012. In addition, image 1008 may include range 1014 to object and surface area pixel measurements information 1016. The range and surface area measurements may be used in determining whether an object may be a human being. In an aspect of the invention, a single person may display a surface area between 0.66-1.0 m$^2$ in frontal area, depending on whether the person is crouching, standing sideways, or facing the camera. In an embodiment, the measurement may be made using the number of pixels the person takes up on the display.

A detection algorithm using the information shown in image 1008 may determine if the surface area or volumetric size of the thermal outline is consistent with that of a human being. In an aspect of the invention, the detection algorithm may identify regions in the image that show IR radiation consistent with a human (e.g. look for temperatures>70 F and <100 F) and label likely humans. Next, the detection algorithm may determine the surface area of regions identified as likely humans in the previous step. Finally, the detection algorithm may classify regions smaller than 0.66 m² or bigger than 1.0 m² as unlikely humans.

If the algorithm determines that the object is a possible human being then the thermal outline 1010 may exhibit a particular color to indicate the results on the display. Those skilled in the art will realize that outline 1010 may be displayed differently depending upon the likelihood that the objects in the image represent human beings. For instance, a color scheme may be utilized in which a red outline represents a "likely human," yellow represents a "possible human," and blue represents an "unlikely human." Those skilled in the art will realize that numerous other ways exist for indicating on a display the likelihood of a person being detected based on thermal characteristics. In FIG. 10, the algorithm may determine that the object 1004 is a possible human and turn outline 1010 yellow.

In another aspect of the invention, an azimuth type display 1020 may be used to display the information. The azimuth type format of the information may be used as inputs to an unmanned vehicle. For instance, an unmanned vehicle for driving purposes may only be interested in objects that are within field of view 1021. As shown in FIG. 10, image 1020 displays a field of view 1021 ranging from approximately −30 degrees to +30 degrees. The zero degree mark may represent a straight ahead driving path whereas any other position may indicate a turn.

The azimuth type display 1020 as shown in FIG. 10 represents similar information as that shown in image 1008. However, the azimuth type information will decrease processor or controller time during execution as information that may not be necessary to navigation of an unmanned vehicle is not processed. In azimuth display 1020, line 1022 may indicate the location of a potential human being based on thermal scans. In addition, disparity information may be indicated by line 1024 where the potential human being was detected per the thermal scans. For example, line 1022 may indicate that at approximately five degrees the change in the thermal characteristics shown on the display image may represent detection of a human being. As shown, this may be at the location where person 1004 was found squatting by bushes 1006.

Figure 11:
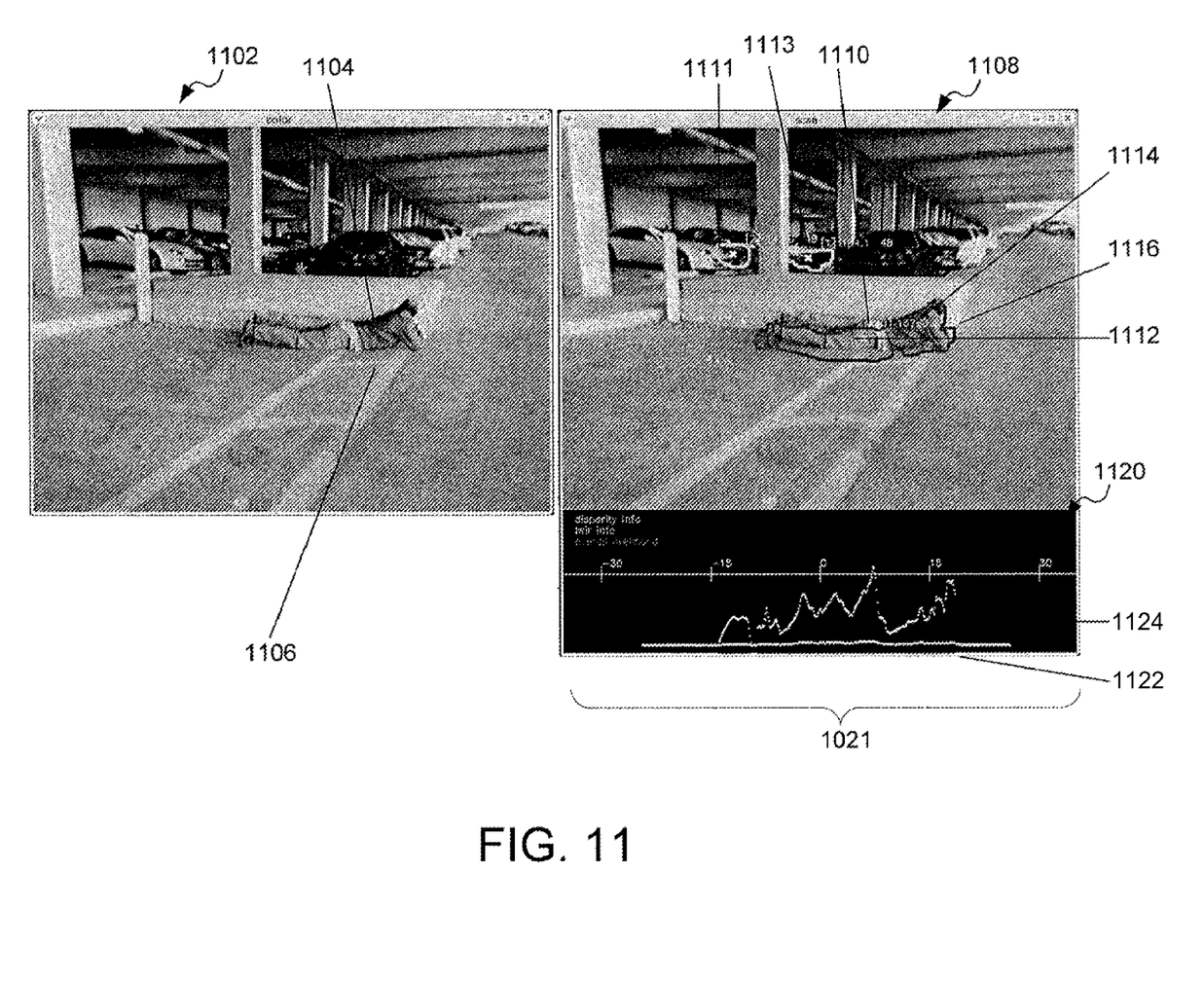
FIG. 11 illustrates an additional exemplary output shown on a display using various cameras to detect human beings in accordance with an aspect of the invention.

FIG. 11 illustrates another exemplary output shown on a display in accordance with an aspect of the invention. In FIG. 11, an image 1102 from a color camera is illustrated in which a person 1104 is shown laying down on payment 1106. In FIG. 11, a second image 1108 may be illustrated in which output from a long-wave infrared camera may be overlaid on color image 1102. An outline 1110 may be overlaid onto image 1102 representing the portion of the image from the long-wave infrared camera which may represent a human being based on measured thermal characteristics.

In FIG. 11, thermal outlines of objects 1111 and 1113 have been displayed. As shown in image 1108, thermal outlines of objects 1111 and 1113 represent automobile engines.

In addition, image 1108 may also include output from a stereo camera 302 to be used to assist in determining whether objects in the image are human beings. For example, a stereo camera 302 may display disparity information for determining a centroid of an object and range to that object. For instance, the centroid of person 1104 may be displayed using an "x" 1112. In addition, image 1108 may include range 1114 to object and surface area pixel measurements information 1116. The range and surface area measurements may be used in determining whether an object may be a human being.

A detection algorithm using the information shown in image 1108 may determine if the surface area or volumetric size of the thermal outline is consistent with that of a human being. If the algorithm determines that the object is a possible human being then the thermal outline 1110 may exhibit a particular color to indicate the results on the display. Those skilled in the art will realize that outline 1010 may be displayed differently depending upon the likelihood that the objects in the image represent human beings.

In FIG. 11, the algorithm may determine that the person is a likely human and the outline around object 1104 may be turned red. In addition, the algorithm may determine that objects 1111 and 1113 are unlikely humans based on the surface area information.

The azimuth type display 1120 illustrating field of view 1121 as shown in FIG. 11 represents similar information as that shown in image 1108. However, the azimuth type information will decrease processor or controller time during execution as information that may not be necessary to navigation of an unmanned vehicle is not processed. In azimuth display 1120, line 1122 may indicate the location of a potential human being based on thermal scans. The thermal scan detects objects 1111 and 1113. In addition, disparity information may be indicated by line 1124 where the likely human being was detected per the thermal scans.

Figure 12:
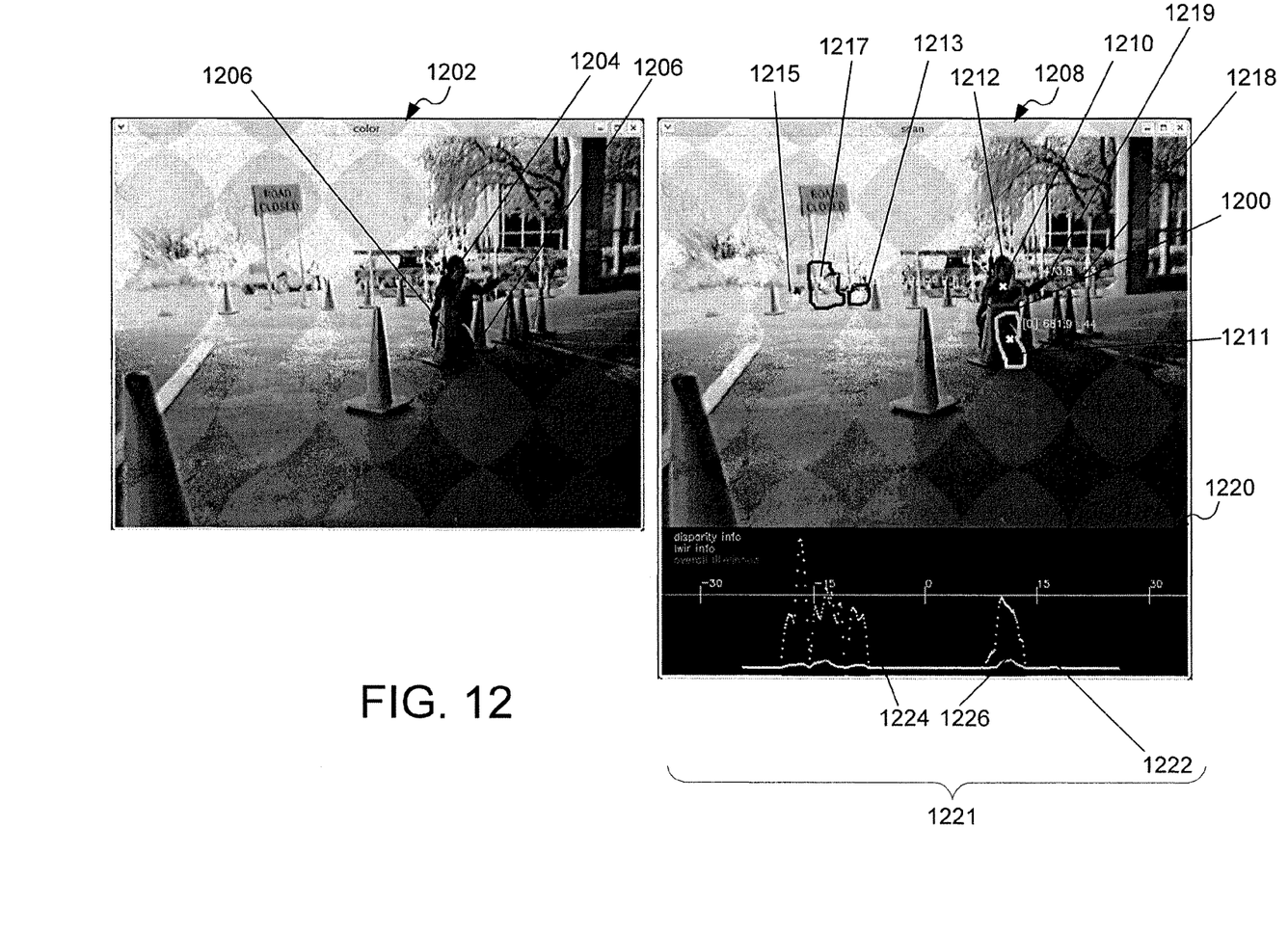
FIG. 12 illustrates yet another exemplary output shown on a display using various cameras to detect human beings in accordance with an aspect of the invention.

FIG. 12 illustrates another exemplary output shown on a display in accordance with an aspect of the invention. In FIG. 12, an image 1202 from a color camera is illustrated in which a person 1204 is shown squatting between road hazard cones 1206. In FIG. 12, a second image 1208 may be illustrated in which output from a long-wave infrared camera may be overlaid on color image 1202. Outlines of objects 1210 and 1211 may be overlaid onto image 1208 representing portions of the image from the long-wave infrared camera which may represent a human being based on measured thermal characteristics. For instance, an object having a temperature ranging between 70 and 100 degrees Fahrenheit may be a human being.

In FIG. 12, thermal outlines of objects 1213, 1215, and 1217 have been displayed. As shown in image 1208, thermal outlines of objects 1213, 1215, and 1217 represent various inanimate objects.

In addition, image 1208 may also include output from a stereo camera 302 to be used to assist in determining whether objects in the image are human beings. For example, a stereo camera 302 may display disparity information for determining a centroid of an object and range to that object. For instance, in image 1208 the centroid of each of the objects detected has been calculated. In this particular example, person 1204 has been detected as two separate objects (1210 and 1211) as the road hazard cones 1206 have obstructed person 1204 from full view of the detection apparatus. The centroid for each of the objects detected may be marked with an "x." For example, the centroid of object 1210 may be displayed using an "x" 1212. In addition, image 1208 may include range to object and surface area pixel measurements information for each of the detected objects. For example, stereo camera 302 may mark with an "x" the centroid (1212) of object 1210. The range of each object to the various sensors and surface area pixel measurements of each object may be used in determining whether an object may be a human being. For example, for object 1210 the range 1218 and the pixel measurement information 1219 which is displayed in FIG. 12 may be used as input to make the determination of whether object 1210 is a human being.

For example, a detection algorithm using the information shown in image 1208 may determine if the surface area or volumetric size of the thermal outline is consistent with that of a human being. If the algorithm determines that the object is a possible human being then the thermal outline 1210 may exhibit a particular color to indicate the results on the display. Those skilled in the art will realize that outline 1210 may be displayed differently depending upon the likelihood that the objects in the image represent human beings.

As shown in FIG. 12, the algorithm may determine that object 1210 is "likely human." Based on this outcome the outline around person 1210 may be turned red. In addition, the algorithm may determine that objects 1211 and 1215 are "possible humans" and turn the outlines around each of these objects yellow. Moreover, the algorithm may determine that objects 1213 and 1217 are "unlikely human" and turn the outlines around each of those objects in image 1208 blue.

The azimuth type display 1220 illustrating field of view 1221 as shown in FIG. 12 may represent similar information as that shown in image 1208. However, the azimuth type information will decrease processor or controller time during execution as information that may not be necessary to navigation of an unmanned vehicle is not processed. In azimuth display 1220, line 1222 may indicate the location of a potential human being based on thermal scans. In addition, disparity information may be indicated by line segments 1224 and 1226.

Figure 13:
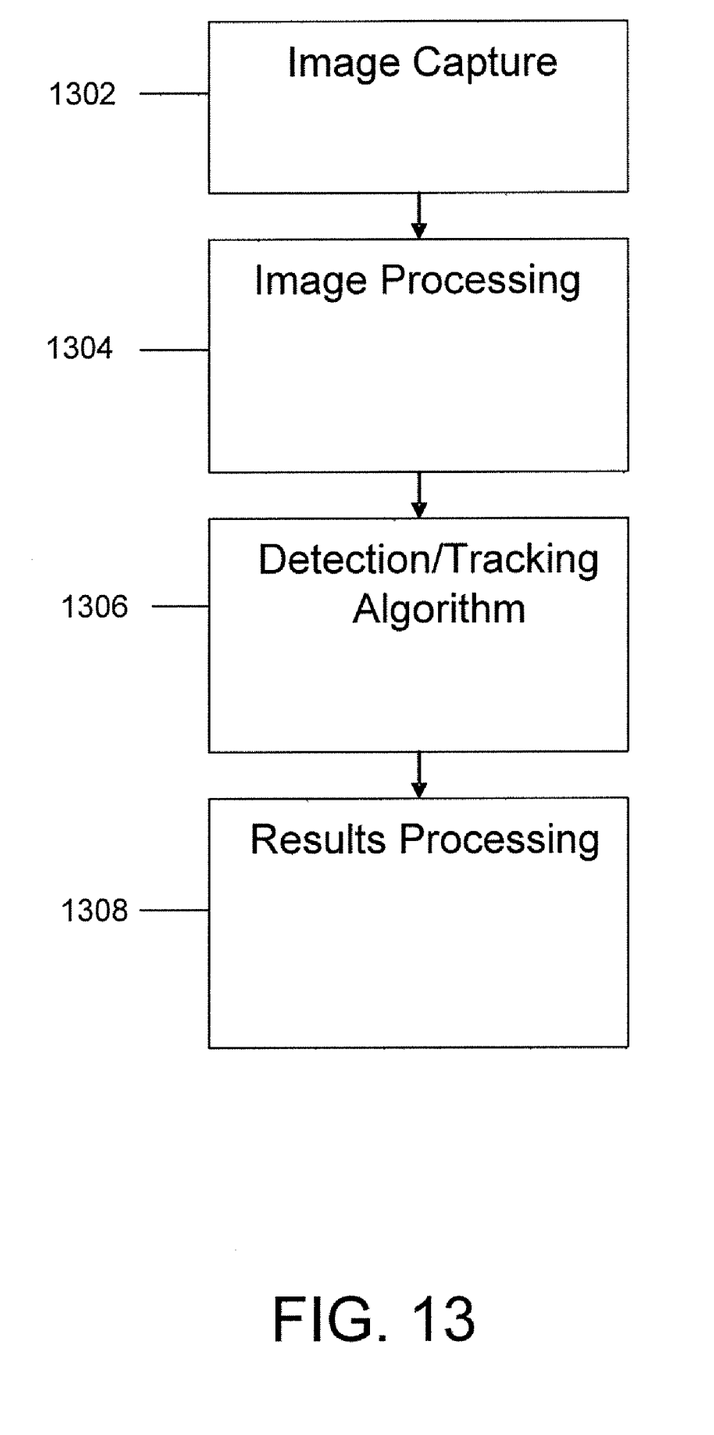
FIG. 13 illustrates a method of detecting human beings in accordance with an aspect of the invention.

FIG. 13 illustrates a method of detecting human beings in accordance with an aspect of the invention. In FIG. 13 at step 1302, simultaneous image capture for each of the connected devices may be initiated. The devices may include a stereo camera 302, a color camera 304, a LWIR camera 306 and/or a LADAR scanner. The stereo camera 302, color camera 304, and LWIR camera 306 may be approximately bore-sighted, such that the physical scene captured in one image, is the same as in the other images.

Image capturing may include a step of displaying the captured images on a display. In step 1304, image processing may be initiated. For example, an undistort function may be used to correct for barrel distortion of the color camera. The undistort function may correct the color image so that a pixel from one camera source corresponds to a pixel from another camera source. In addition, stereo calculations may be performed on the output of stereo camera 306.

Next in step 1306, a detection algorithm may be executed based on the images captured from the connected devices. The detection algorithm applied may be based on the various different connected devices and types of information captured. For example, images from a LWIR camera 306 and a stereo camera 302 may be overlaid using a detection algorithm on each other as shown above in FIGS. 10-12. The detection algorithm may determine if the objects shown in the images are "likely human," "possible human," or "unlikely human." In addition, an azimuth based likelihood estimation calculation may be calculated and displayed based on inputs from the stereo camera 302 and LWIR camera 306.

In another aspect of the invention, areas of interest identified in the LWIR image from the LWIR camera 306 may be identified in a color image. A list of pixels forming the image may create segmented images so that those segmented images may be referred to separately from the whole image. The segmented images may be used in a pattern detection algorithm to detect human shapes such as faces. In yet another aspect of the invention, areas of interest in the LWIR image may be identified in a color image. These segmented images may be used in a pattern detection algorithm to find textures learned to match a specific human such as a camouflage clothing pattern. The segmented images may be used as training images to train a learning-based human detection algorithm or image classifier. For example, an anchor data set may be stored of various human being characteristics and patterns that may later be used by a new detection algorithm to detect human beings.

In another aspect of the invention, two LWIR cameras may be used in a stereo configuration. An area of interest corresponding to the thermal emissions of a human being may be identified and the range and size of the area of interest determined by stereo disparity calculation. Areas of interest may be labeled as likely human and their relative locations noted.

In step 1308, results processing may be initiated. The results processing may include displaying the results on a display to be viewed by others or transmitting the results to an unmanned vehicle for use decision making. The results processing may also include saving of output images or output video for future processing and/or analysis.

The invention has been described with respect to specific examples including various aspects of the invention. Those skilled in the art will appreciate that there are numerous variations and permutations of the above described systems and techniques. Thus, the spirit and scope of the invention should be construed broadly as set forth in the appended claims.

I claim:

1. A method comprising:
   capturing an image in a field of view with an infrared camera;
   capturing the image in the field of view with another device comprising a stereo camera, wherein output from the stereo camera includes a disparity map;
   determining one or more areas of the image that fall within a temperature range indicative of thermal emission characteristics of a human being based on output from the infrared camera;
   generating a masked disparity map that includes the disparity map masked with the one or more areas of the image; and
   determining that the image includes a human being by determining that a surface area of the masked disparity map is consistent with a surface area of the human being.

2. The method of claim 1, further including displaying a likelihood that the image includes a human being.

3. The method of claim 1, further comprising capturing the image in the field of view with a color camera.

4. The method of claim 1, wherein the infrared camera comprises a long-wave infrared camera.

5. The method of claim 3, further comprising generating a masked color map that includes an output of the color camera masked with the one or more areas of the image.

6. The method of claim 5, further comprising determining if the masked color map includes a human face using a face detection algorithm.

7. The method of claim 5, further comprising determining if the masked color map includes colors that represent human skin colors using a color matching algorithm.

8. An apparatus comprising:
   one or more communication interfaces configured to receive data from a field of view simultaneously recorded by an infrared camera and a stereo camera; and
   a computer configured to:
   determine one or more areas of the field of view that exhibits thermal emission characteristics of a human being based on the data recorded by the infrared camera;
   generate a masked disparity map that includes disparity data within the determined one or more areas of the field of view, wherein the disparity data is derived from the data recorded by the stereo camera; and determine that the field of view includes a human being by determining that a surface area of the masked disparity map is consistent with a surface area of the human being.

9. The apparatus of claim 8, further comprising a long-wave infrared camera.

10. The apparatus of claim 8, further comprising the infrared camera and the stereo camera, wherein the infrared and stereo cameras are bore-sighted, such that a physical scene captured in the field of view by each camera is the same.

11. The apparatus of claim 8, further comprising a color camera.

12. The apparatus of claim 8, further comprising a Laser-Radar scanner.

13. The method of claim 1, wherein the temperature range indicative of thermal emission characteristics of the human being is approximately 70 degrees Fahrenheit to 100 degrees Fahrenheit.

14. The method of claim 1, wherein the determining that the image includes the human being further comprises determining that a volumetric size of the masked disparity map is consistent with a volume of the human being.

15. The apparatus of claim 8, wherein the computer is further configured to determine that the field of view includes the human being by determining that a volumetric size of the masked disparity map is consistent with a volume of the human being.

16. A non-transitory computer readable memory comprising software, that when executed by a processor, causes the processor to:

receive data from a field of view simultaneously recorded by an infrared camera and a stereo camera;

determine one or more areas of the field of view that exhibits thermal emission characteristics of a human being based on the data recorded by the infrared camera;

generate a masked disparity map that includes disparity data within the determined one or more areas of the field of view, wherein the disparity data is derived from the data recorded by the stereo camera; and determine that the field of view includes a human being by determining that a surface area of the masked disparity map is consistent with a surface area of the human being.

17. The non-transitory computer readable memory of claim 16, wherein the software, when executed by the processor, further causes the processor to determine that the image includes the human being by determining that a volumetric size of the masked disparity map is consistent with a volume of the human being.

\* \* \* \* \*